(12) United States Patent
Hagen et al.

(10) Patent No.: US 10,444,420 B2
(45) Date of Patent: Oct. 15, 2019

(54) INDIRECT LIGHTING ARRANGEMENT, AND METHOD FOR PRODUCING AN INDIRECT LIGHTING ARRANGEMENT

(71) Applicant: Covestro Deutschland AG, Leverkusen (DE)

(72) Inventors: Rainer Hagen, Leverkusen (DE); Günther Walze, Leverkusen (DE); Thomas Fäcke, Leverkusen (DE); Friedrich-Karl Bruder, Krefeld (DE); Dennis Hönel, Zülpich-Wichterich (DE); Thomas Rölle, Leverkusen (DE); Horst Berneth, Leverkusen (DE); Marc-Stephan Weiser, Leverkusen (DE)

(73) Assignee: Covestro Deutschland AG, Leverkusen (DE)

(*) Notice: Subject to any disclaimer, the term of this patent is extended or adjusted under 35 U.S.C. 154(b) by 27 days.

(21) Appl. No.: 15/738,694

(22) PCT Filed: Jun. 23, 2016

(86) PCT No.: PCT/EP2016/064564
§ 371 (c)(1),
(2) Date: Dec. 21, 2017

(87) PCT Pub. No.: WO2016/207294
PCT Pub. Date: Dec. 29, 2016

(65) Prior Publication Data
US 2018/0188437 A1    Jul. 5, 2018

(30) Foreign Application Priority Data

Jun. 26, 2015  (EP) .................... 15174074

(51) Int. Cl.
*F21V 8/00* (2006.01)
*G02B 5/32* (2006.01)
*G02B 27/09* (2006.01)

(52) U.S. Cl.
CPC ............. *G02B 6/0028* (2013.01); *G02B 5/32* (2013.01); *G02B 6/0001* (2013.01);
(Continued)

(58) Field of Classification Search
CPC ......... G02B 6/001; G02B 6/0028; G02B 5/32
(Continued)

(56) References Cited

U.S. PATENT DOCUMENTS 5,835,661 A  11/1998 Tai et al.
6,431,716 B1  8/2002 Kusakabe
(Continued)

FOREIGN PATENT DOCUMENTS

EP  2023193 A1  2/2009
EP  2128682 A2  12/2009
WO  WO-2014026917 A1  2/2014

OTHER PUBLICATIONS

International Search Report for PCT/EP2016/064564 dated Sep. 20, 2016.
(Continued)

*Primary Examiner* — Toan C Ly
(74) *Attorney, Agent, or Firm* — Drinker Biddle & Reath LLP

(57) ABSTRACT

The invention relates to an indirect lighting arrangement (2, 2.1, 2.2, 2.3, 2.4, 2.5) comprising at least one cylindrical waveguide (4). At least one end (12.1, 12.2) of the cylindrical waveguide (4) is designed to couple light from a first light source (1) into the cylindrical waveguide (4), and the lateral surface (10) of the cylindrical wave guide (4) has a coupling section (6) which is designed to optically couple
(Continued)

the cylindrical waveguide (4) to an arrangeable plate-shaped waveguide (16). At least the coupling section (6) has at least one holographic optical element (8) which is designed to emit light from the cylindrical waveguide (4) into the arrangeable plate-shaped waveguide (16).

19 Claims, 7 Drawing Sheets

(52) U.S. Cl.
CPC .......... *G02B 27/0955* (2013.01); *G02B 6/001* (2013.01); *G02B 6/0006* (2013.01)

(58) Field of Classification Search
USPC ........................................................ 362/606
See application file for complete search history.

(56) References Cited

U.S. PATENT DOCUMENTS

| | | |
|---|---|---|
| 7,549,783 B2 | 6/2009 | Cassarly et al. |
| 7,726,854 B2* | 6/2010 | Bourdin ............... G02B 6/0001 |
| | | 362/487 |
| 7,817,887 B2* | 10/2010 | Inditsky ............... G02B 6/0011 |
| | | 349/65 |
| 2011/0026128 A1 | 2/2011 | Baker et al. |

OTHER PUBLICATIONS

Written Opinion of the International Searching Authority for PCT/EP2016/064564 dated Sep. 20, 2016.

\* cited by examiner

INDIRECT LIGHTING ARRANGEMENT, AND METHOD FOR PRODUCING AN INDIRECT LIGHTING ARRANGEMENT

CROSS-REFERENCE TO RELATED APPLICATIONS

This application is a national stage application (under 35 U.S.C. § 371 of PCT/EP2016/064564, filed Jun. 23, 2016, which claims benefit of European Application No. 15174074.3, filed Jun. 26, 2015, both of which are incorporated herein by reference in their entirety.

The invention relates to an indirect lighting arrangement comprising at least one cylindrical light guide, wherein at least one end of the cylindrical light guide is configured in order to couple light from a first light source into the cylindrical light guide, and the lateral face of the cylindrical light guide has a coupling section configured for optical coupling of the cylindrical light guide to an arrangeable plate-shaped light guide. The invention furthermore relates to a method for producing an indirect lighting arrangement, to a display screen and to a lighting system.

BACKGROUND OF THE INVENTION

Flat lighting arrangements which emit homogeneous light in a predetermined direction are gaining increased importance. One exemplary and nonexclusive application of such a lighting arrangement is in a so-called backlight unit (BLU) for high-resolution color flat display screens. Alternative applications are general lighting systems and, in particular, lighting systems for motor vehicles.

The basic requirements for the emission characteristics of a BLU are, for example in the case of liquid-crystal display screens (LC displays), dictated by the general quality criteria for currently available product types, and in particular by the technology of the imaging LC panels used. They may be described as follows: the light should be emitted as a well-collimated, spectrally defined light beam which keeps its properties constant over the entire face of the BLU, so that uniform illumination of the entire LC panel from a principal direction is achieved. The principal direction of the lighting is the normal to the LC panel face in the case of conventional LCDs for 2D viewing and, in the case of special directional BLUs which have been developed for autostereoscopic 3D viewing, is horizontally tilted in one direction.

BRIEF SUMMARY OF THE INVENTION

In current backlight units for LC displays, the primary light sources used are usually light-emitting diodes (LEDs) which emit white light with additive color mixing or frequency conversion. LEDs are preferred over fluorescent tubes, for example cold-cathode fluorescent lamps, because of their compactness, good energy efficiency, low costs, the wide selection of emission spectra, and the possibility of grouping individual point emitters in modules.

In the case of BLUs, but also in other applications, distinction is basically made between two different types of lighting arrangements, namely the direct lighting arrangement and the indirect lighting arrangement. These two different types differ significantly from one another in their structure and their functionality. Only the more common indirect lighting arrangement will be described below, which can be structurally configured to be particularly flat and can therefore satisfy the present requirement of a particularly small installation depth better than the direct lighting arrangement.

The most widespread BLU concept is based on indirect backlighting by means of edge illumination. The light of the LEDs is in this case coupled in over the length of the edge of a unitary or optionally segmented light guide plate, propagated by total reflection in the light guide, and directed in the direction of the LC panel by means of light output elements, which may be applied on the rearward and/or on the front-side face of the light guide and/or in its internal volume. A continuously illuminating exit face is thus produced. On the rear side of the flat light guide, a reflective screen or a white light scatterer may be used in order to feed light emerging to the rear back into the actively light-directing region. Such edge-illuminating BLUs can if required he produced with a small installation depth, which offers a design advantage and simply also a functional advantage for the LCD.

A corresponding indirect lighting arrangement of the prior art has, however, the following disadvantage: first, the light field coupled out is insufficiently homogeneous in relation to angle distribution and light power. It subsequently needs to be angularly corrected and homogenized by optical elements, for example by brightness enhancement films (BEF), which are applied as a film or plate between the light guide and the panel.

Technical solution approaches, such as the multilayer waveguides described in EP-A 2 023 193, or the hybrid designs described in the same application, consisting of edge illumination and direct illumination, further increase the number of components and therefore the complexity of the BLU, and negate the installation space advantage of edge illumination.

The second disadvantage of conventional edge-illuminated BLUs is a consequence of the direct conversion of many divergent point light sources into an extended collimated wave. Thus, any type of manufacturing tolerance in the LED modules, particularly in their positioning relative to the input face of the flat light waveguide (particularly in combination with the downstream light-directing elements) have a commensurately more critical effect when the area of the BLU is greater. Undefined changes of the light path thus occur. In practice, variations in the light field striking the LC panel lead to variations in the image contrast and/or to poor black values of the LC display.

Full omission of the planar or flat light guide in order to avoid these problems cannot be carried out in practice because an undesired bright light spot (hot spot) would be produced on the panel by the so-called headlamp effect.

Solutions are known in the prior art in which the problem of the sensitivity to the aforementioned tolerances in the point light sources is avoided. For example, light expansion systems based on a cylindrical light guide or on a light pipe are known. A light pipe can convert the light of a compact, substantially point light source into a light line.

At one front edge, or one end, of a transparent or translucent cylindrical light guide, light emitted by a first light source may be coupled into the cylindrical light guide. For example, the light of the first light source may initially be concentrated by means of a collimator (light-diffracting optical element; in the simplest case a converging lens), before it is coupled into the light pipe at one of its ends. This elongate light guide may have various cross sections. For example, the cross section may be circular or square, or have a geometrical shape with an additional straight section plane.

The cylindrical light guide has suitable exit openings, or coupling sections and/or output structures, for coupling the light out of the cylindrical light guide. The output structures known from the prior art are in particular particulate scattering centers, or prismatic or lens-shaped grating structures. The effect of these is that an elongate luminous face can be formed on the lateral face of the cylindrical light guide, i.e. a coupling section, with a defined intensity distribution. Such lighting arrangements may, for example, be incorporated into edge-illuminated BLUs by arranging them between a first light source and an arrangeable planar or flat light guide (waveguide). The light or light wave emerging from the elongate light guide can be coupled into the planar light guide through one of its edges. Examples of the prior art are disclosed in documents U.S. Pat. No. 5,835,661 A and U.S. Pat. No. 7,549,783 A.

The advantages of a lighting arrangement comprising a cylindrical light guide for expanding light compared with conventional edge-illumination designs with a plurality of individual LEDs are, in particular, that the light is already substantially homogenized in one spatial direction, or otherwise adapted to the geometrical requirements of the BLU, before it is coupled into the planar light guide. Furthermore, the repercussions of production and position variations of LEDs aligned next to one another can be reduced.

However, the pipe-shaped light guides known from the prior art have disadvantages. For output of the light, these cylindrical light guides have scattering output elements. In the case of scattering output elements, the light emerges at angles which, after coupling into the flat light guide, are not subject to total reflection in the flat light guide. As a consequence, the luminous power of the BLU decreases. In order to reduce the reduction of the luminous power, it is proposed in the prior art to capture the light emerging at unsuitable angles by means of reflective or refractive elements. A disadvantage with this is the extra outlay associated with the additional elements.

Furthermore, the wide dispersion cone has the problem known from conventional edge-type BLUs that the intensity of the light in the flat light guide decreases with an increasing propagation distance. This in turn makes the construction of large-area BLUs more difficult, or even prevents it.

With prismatic, lenticular and related output structures, such as are presented in U.S. Pat. No. 5,835,661 A, targeted input of the light into the flat light guide can in fact be achieved. Yet since in this case the light pipe emits over its entire internal cross section light which needs to he delivered to the downstream BLU components, the thickness or installation depth of the cylindrical light guide determines the lower limit of the allowed design thickness of the flat BLU waveguide. Optimization of the flat light guide in terms of visually attractive thin and reduced-weight embodiments is not possible, without losing light for the input.

With the conventional refractive light-directing structures described in U.S. Pat. No. 5,835,661 A, a high-quality light wave also cannot be produced because of the impression accuracies occurring in the production method, for example an injection molding method, injection-compression molding method and/or an engraving method, and the limited structural resolutions.

The object of the invention is therefore to provide a lighting arrangement for indirect lighting, which straightforwardly allows defined, targeted and homogeneous output of light from a cylindrical light guide.

According to a first aspect of the invention, the object is achieved with a lighting arrangement for indirect lighting as claimed in patent claim 1. The lighting arrangement comprises at least one cylindrical light guide. At least one end of the cylindrical light guide is configured in order to couple light from a first light source into the cylindrical light guide.

The lateral face of the cylindrical light guide has a coupling section configured for optical coupling of the cylindrical light guide to an arrangeable plate-shaped light guide. At least the coupling section has at least one holographic optical element configured for emitting light from the cylindrical light guide into the arrangeable plate-shaped light guide.

DETAILED DESCRIPTION OF THE INVENTION

A holographic optical element in the context of the present invention is intended to mean an optical element which comprises a volume hologram (sometimes referred to below as a "hologram" for brevity). According to the present invention, a volume hologram is a light-diffracting optical element based on an optically transmissive film, configured as a transmission or reflection hologram, which has been introduced as a phase grating or holographic grating into the volume of a film. When illuminated with light, the volume hologram directs this light in a new spatial direction, in which case the light field generated may assume a very wide variety of shapes which have been established during the preceding holographic production method.

Since, in contrast to the prior art, the cylindrical light guide has an output element in the form of a holographic optical element, light can be output from the cylindrical light guide in a defined, targeted and homogeneous manner. In other words, the light guide according to the invention is configured in order to couple light, in particular with a predetermined angle range, into a plate-shaped light guide.

The indirect lighting arrangement comprises an essentially cylindrical light guide. The elongate light guide has two ends, arranged essentially parallel to and opposite one another, and a lateral face. At least one of the ends, or end faces, of the cylindrical light guide is configured in order to couple light, or at least one light beam, from a first light source into the cylindrical light guide.

The first light source may, for example, comprise at least one light-emitting diode or a laser. The light, or the light beam, of the first light source is, in particular, coupled into the cylindrical light guide in such a way that it propagates in the light guide according to the law of total internal reflection (TIR). For example, an optical beam shaping element may be provided between the first light source and the cylindrical light guide. The beam shaping element may be configured in order to convert the light beam, in particular the collimated light beam, of the first light source into a divergent light beam with suitable expansion and a suitable beam profile, so that the divergent light beam propagates in the cylindrical light guide according to the law of total internal reflection (TIR).

A part of the lateral face of the cylindrical light guide is formed as a coupling section. A coupling section according to the invention constitutes, in particular, a region of the lateral face of the cylindrical light guide in which light, or at least one light beam, is emitted or output from the cylindrical light guide. The light which has been output may be coupled into a further, in particular flat light guide. The shape and dimension of the coupling section correspond, in particular, to the (desired) input face of the further light guide. For example, the coupling section may be configured as an elongate face.

According to the invention, it has been discovered that light can be emitted, or directed, in a defined way from the cylindrical light guide when the coupling section of the cylindrical light guide is provided with a holographic optical element. Preferably, the holographic optical element has a grating structure such that light emitted from the cylindrical light guide with a predetermined angle range can, in particular, be coupled into the arrangeable plate-shaped light guide. The angle range refers, in particular, to an angle between the light beam which is output and the surface normal of the input face of the plate-shaped light guide. In other words, the light leaves the cylindrical light guide with a predetermined angle range.

The lighting arrangement according to the invention constitutes, in particular, a highly precise light expansion system in the form of a cylindrical light guide having a holographic optical element. The light expansion system is suitable for very flatly constructed but nevertheless large-area BLUs. Such lighting arrangements are simple to manufacture, mechanically robust and couplable mechanically as well as optically to various types of planar light guides, or mode waveguides. The lighting arrangement according to the invention may be manufactured economically, in particular by using a small number of compact light sources, and can generate a light beam which is very well collimated and can therefore be used for low-loss wave guiding, and can have low light losses overall. Various new types of compact, energy-efficient and high-power light sources, such as LEDs and lasers, in particular diode lasers, may be used in a straightforward way as the first light source for the lighting arrangement according to the invention. Adaptation to various lighting geometries, in particular to various output angles, can be provided.

According to a first embodiment of the lighting arrangement according to the invention, the holographic optical element may have a grating structure such that light striking the holographic optical element from the cylindrical light guide is acquired. The acquired light can then be deviated by the grating structure of the holographic optical element in such a way that the light leaves the cylindrical light guide in a spatial direction with an intensity angle distribution which corresponds essentially to total reflection in the arrangeable plate-shaped light guide. The principal direction of the diffraction is, in particular, perpendicular to the principal axis of the cylindrical light guide. Because the light is output from the cylindrical light guide in such a way that the light that is output can propagate fully in the couplable planar light guide by total reflection, no light is lost. No additional optical element for capturing light is required.

In principle, the shape and dimension of the coupling section of the cylindrical light guide may be arbitrary. According to a preferred embodiment of the lighting arrangement, the coupling section may be a strip-shaped coupling face extending essentially parallel to the principal axis of the cylindrical light guide. The strip-shaped coupling section may have a holographic optical element in the form of a strip-shaped film. The maximum length of the strip-shaped coupling section may, in particular, correspond to an edge length of the plate-shaped light guide. The maximum width of the light guide preferably corresponds to the thickness of the plate-shaped light guide. It is to be understood that the dimensions of the strip-shaped coupling section may also be smaller.

In order to be able to apply the holographic optical element in a particularly straightforward way on the cylindrical light guide, in particular the coupling section, according to another embodiment of the lighting arrangement the holographic optical element is formed from a self-adhesive material. The self-adhesive holographic optical element may be adhesively bonded on the coupling section. In particular, the adhesive bonding may be carried out exclusively by using the self-adhesive properties of the holographic optical element. For example, the adhesive bonding may be carried out with simultaneous exertion of pressure. For example, by applying a mechanical force, for example by screwing together the cylindrical light guide and the plate-shaped light guide, secure contacting of the self-adhesive holographic optical element may also be achieved during operation. By the holographic optical element directly without an additional layer, the light can be directed with particularly low losses.

For a particularly secure connection between the cylindrical light guide and the holographic optical element, as an alternative or in addition to its self-adhesive property, the holographic optical element may have at least one (additional) bonding layer at least on one of its two side faces. The holographic optical element may be applied on the coupling section by means of the bonding layer. Preferably, the holographic optical element may be enclosed on both sides by a bonding layer.

The lighting arrangements according to the invention produce a very accurately defined spatial intensity distribution and propagation directions, and therefore a high beam quality from the input face, which makes it possible to construct very flatly built light guide plates and mode waveguides in various, in particular large-area, embodiments, which have low-loss wave guiding so that mechanically robust BLUs with a highlight efficiency and low technical complexity can be produced.

For particularly straightforward application of the holographic optical element on the cylindrical light guide, the holographic optical element may be formed as a transfer film. If the holographic optical element is formed from a photopolymer, the photopolymer may be enclosed, preferably on both sides, by a peelable substrate and a thin bonding layer. After adhesive bonding of the photopolymer to the cylindrical light guide, the substrate may be peeled off from the photopolymer nondestructively and without leaving residue. In this case, only the photopolymer and the bonding layer remain on the light guide.

In principle, the cylindrical light guide may have an arbitrary cross section. For example, the cylindrical light guide may have a rectangular, in particular square, or elliptical cross section. According to a preferred embodiment, the cylindrical light guide may have a circular cross section. With a circular cross section, a particularly homogeneous light distribution can be achieved in the cylindrical light guide. The diameter of the cross section may in particular be between 1 mm and 10 mm, preferably between 2 mm and 5 mm.

According to another embodiment of the lighting arrangement according to the invention, the strip-shaped film may occupy at least less than 20°, preferably at least less than 10°, particularly preferably at least less than 5°, and extremely preferably 1-3° of the 360° circumferential area of the lateral face of the cylindrical light guide. Particularly in the case of a strip width of from 1 to 3°, a particularly thin lighting arrangement provided.

The lighting arrangement may jointly comprise the plate-shaped light guide. The holographic optical element may be optically coupled to at least one narrow side of the plate-shaped light guide, in such a way that the light is coupled into the narrow side of the plate-shaped light guide. In particular, all the light which is output is coupled into the planar light guide. As an alternative or in addition, the holographic optical element may be optically coupled to at least one wide side of the plate-shaped light guide, in such a way that the light is coupled into the wide side of the plate-shaped light guide. In particular, all the light which is output is coupled into the planar light guide. It is to be understood that two or more cylindrical light guides may be provided, which may be applied in a corresponding way on the further narrow sides and/or wide sides of the plate-shaped light guide.

The optical coupling between the cylindrical light guide, or the holographic element, and the plate-shaped light guide may take place (almost) directly. In this case, the holographic optical element may be connected with one side to the cylindrical waveguide and/or the plate-shaped light guide directly or by means of a bonding layer (and optionally a further thermoplastic layer of the holographic optical element). In an alternative embodiment of the lighting arrangement according to the invention, a transparent coupling substrate may be arranged between the holographic optical element and the plate-shaped light guide. Customary materials for the optically transparent substrate are glass or plastic. A coupling substrate improves the mechanical properties of the lighting arrangement.

Furthermore, the cylindrical light guide may be formed from a material selected from the group glass, polymethyl methacrylate, polydimethylsiloxane, polycarbonate or polystyrene. The plate-shaped light guide may also be formed from a material selected from the group glass, polymethyl methacrylate, polydimethylsiloxane, polycarbonate or polystyrene. A light guide may also be formed from different amorphous thermoplastic materials or mixtures of such substances. Corresponding light guide materials are distinguished in that a solid body which is homogeneous, non-scattering and transparent for the wavelength of the light source can be formed. The light can propagate in different beam paths, also referred to as wave modes (abbreviated form: modes) in a corresponding light guide material. In particular, all modes other than the axial mode, in which the light travels along the central axis of the cylindrical light guide, are distinguished by total internal reflection (TIR) at an interface with the surrounding medium air. Depending on the entry angle into the light guide and the diameter of the light guide, there may be very many different modes, which can be described individually by their propagation angle relative to the virtual pipe axis. With preferred refractive index values of the light guide of $n_{WG}=1.4$ to $1.8$ and the refractive index of air $n_{air}=1$, propagation angles of up to $33.7°$ (for $n_{WG}=1.8$) and respectively $44.4°$ (for $n_{WG}=1.4$) are subject to the law of total reflection.

As already described, at least one of the two ends or end faces of the cylindrical light guide is configured to couple or introduce light of a first light source into the cylindrical light guide. According to a preferred embodiment, the other end of the cylindrical light guide may he configured to be reflective. For example, the other end may be mirrored. (Unintended) light exit can be avoided, and a good light efficiency of the lighting arrangement can therefore be provided. In an alternative embodiment, the invention proposes that the other end of the cylindrical light guide be configured in such a way that the light of a second light source can be coupled into the cylindrical light guide. The available output light power can be increased.

Furthermore, according to another embodiment of the lighting arrangement according to the invention, the holographic optical element may be formed from a material selected from the group silver halide emulsions, dichromate gelatins, or photopolymers. The photopolymers may be formed from at least photoinitiator systems and polymerizable writing monomers. The photopolymers may preferably comprise plasticizers and/or thermoplastic binders and/or crosslinked matrix polymers.

It is particularly preferred for the photopolymers to consist of a photoinitiator system, one or more writing monomers, plasticizers and crosslinked matrix polymers.

The lighting arrangement may preferably have at least one light source. The light source may be a laser module or a laser diode module, in particular a high-power laser diode module. The laser module may, for example, be an RGB laser module. The RGB laser module may emit three colors of monochromatic light (for example red, green and blue). As a high-power laser diode module, it is for example possible to use a high-power white light-emitting diode (power LED) with primary optics. The primary optics comprise, for example, an encapsulation compound for the LED chip with its substrate and its terminals, and a downstream optical element such as a converging lens or a parabolic reflector. The primary optics lead, in particular, to collimation of the white light emitted from the chip over a wide solid angle.

Preferably, a beam shaping module may be arranged between the first and/or second light source and the respective end of the cylindrical light guide, particularly in order to convert a collimated light beam into a divergent light beam, in such a way that light which has entered the cylindrical light guide is subject to total reflection in the cylindrical light guide.

The cylindrical light guide and/or the plate-shaped light guide may be produced by casting, injection molding and/or mechanical processing. A corresponding light guide can be produced in a straightforward way. In particular, the entire lighting arrangement can be produced in a simple and economical way when (in addition) a strip-shaped holographic optical film is adhesively bonded in the manner described above onto a light guide which has been produced.

Another aspect of the invention is a method for producing a lighting arrangement for indirect lighting as claimed in patent claim 13. The lighting arrangement produced by the method is, in particular, a lighting arrangement described above. The method comprises provision of a cylindrical light guide, at least one end of the cylindrical light guide being configured in order to couple light from a first light source into the cylindrical light guide, and the lateral face of the cylindrical light guide having a coupling section configured for optical coupling of the cylindrical light guide to an arrangeable plate-shaped light guide. The method furthermore comprises that at least one holographic optical element configured for emitting light from the cylindrical light guide into the arrangeable plate-shaped light guide is applied on the coupling section.

By a holographic optical element being applied, in particular adhesively bonded, on the light guide, it is possible to produce in a straightforward way a lighting arrangement in which the light can be output from the cylindrical light guide in a defined, targeted and homogeneous way.

Yet another aspect of the invention is a display screen, in particular a flat display screen, comprising at least one lighting arrangement as described above. In particular, the lighting arrangement according to the invention may be at least as part of a backlight unit of a display screen. The display screen may, in particular, be an LCD display screen.

Yet another aspect of the invention is a lamp system, in particular a motor vehicle lamp, comprising at least one lighting arrangement as described above. The lighting system may be a flat lamp system, for example for the interior of a building or motor vehicle or for illuminating the surroundings of a motor vehicle or for the exterior functional lights of a motor vehicle. In particular, the lighting arrangement may be used in a motor vehicle headlamp, for example for a so-called daytime running light. There is great freedom in the design of the flat lamp system and of the motor vehicle headlamp.

The features of the devices and methods may be combined freely with one another. In particular, features of the description and/or of the dependent patent claims may also be independently inventive with full or partial omission of features of the independent patent claims, separately, or freely combined with one another.

There are then a multiplicity of possibilities for configuring and further developing the lighting arrangement according to the invention and the method according to the invention for producing a lighting arrangement. In this regard reference is, on the one hand, made to the dependent claims subordinate to the independent patent claims, and on the other hand to the description of exemplary embodiments in connection with the drawing. In the drawing:

BRIEF DESCRIPTION OF THE DRAWINGS

FIG. 1 shows a first exemplary embodiment of a lighting arrangement 2 according to the present invention. The lighting arrangement 2 comprises a cylindrical light guide 4. The present cylindrical light guide 4 has two ends 12.1, 12.2, or end faces 12.1, 12.2, and a lateral face 10. The cylindrical light guide 4 furthermore has a circular cross section. It is to be understood that, according to other variants of the invention, the cylindrical light guide may also have a different shape and, for example, may have a rectangular or elliptical cross section.

Figure 1:
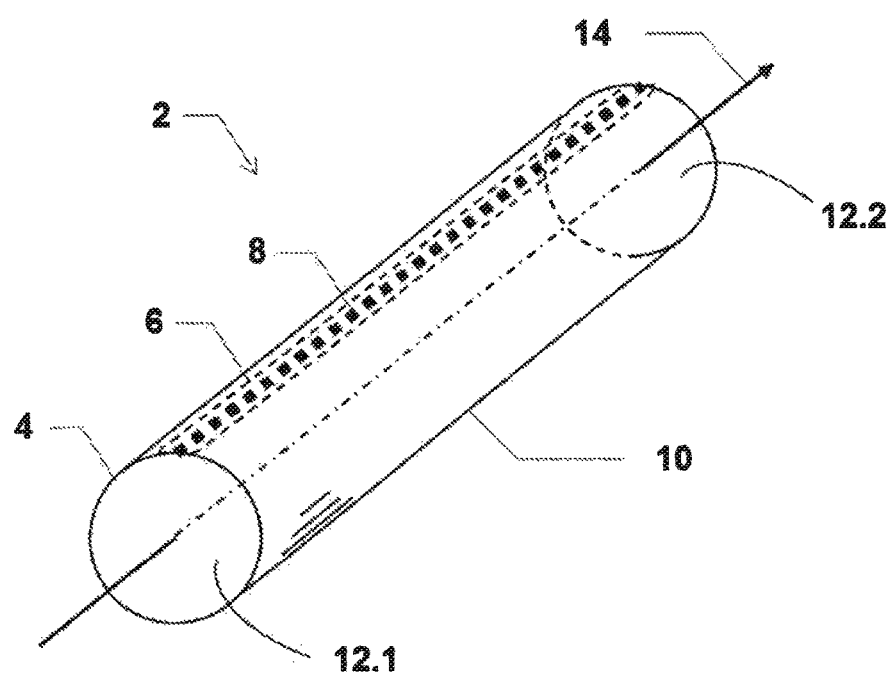
FIG. 1 shows a schematic representation of a first exemplary embodiment of a lighting arrangement according to the invention.

The cylindrical light guide 4 has a coupling section 6. In the present exemplary embodiment, the coupling section 6 is formed by a holographic optical element 8. For example, a holographic optical film 8 may be adhesively bonded on the lateral face 10 of the cylindrical light guide 4. The holographic optical element 8 is configured in order to output light, which has been coupled in through one of the end faces 12.1, 12.2 and propagates in the direction of the principal axis 14 of the light guide 4, out of the cylindrical light guide 4 in a defined way, as will be described in detail below.

The lighting arrangement 2 represented may in particular be used as a compact beam expander and surface radiator with a defined emission characteristic in a backlight unit for flat display screens.

Figure 2:
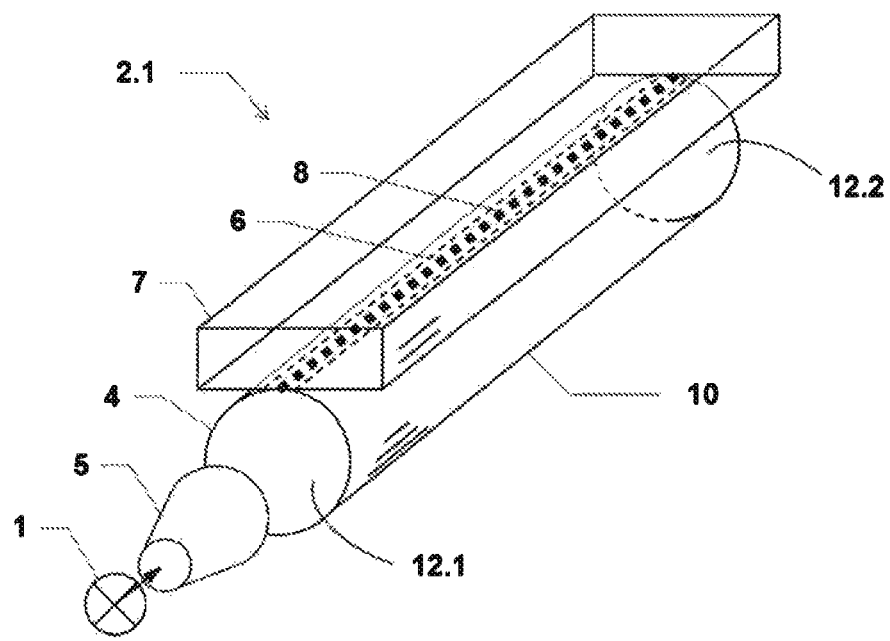
FIG. 2 shows a schematic representation of another exemplary embodiment of a lighting arrangement according to the invention.

FIG. 2 shows another exemplary embodiment of a lighting arrangement 2.1 according to the invention. The lighting arrangement 2.1 represented comprises firstly the above-described cylindrical light pipe 4 having a coupling section 6 formed by a holographic optical element 8. The coupling section 6 is formed in a strip shape and extends parallel to the principal axis 14 from one end to the other 12.1, 12.2 of the cylindrical light guide 4. As already described, the holographic optical element 8 is formed for targeted coupling of light into a planar light guide or planar waveguide (not shown in FIG. 2).

Besides the cylindrical light guide 4 with the holographic optical element 8, the lighting arrangement 2.1 in the present case comprises a first light source 1, a beam shaping module 5 and a substrate 7.

The first light source 1 may be a laser module 1. In particular, an RGB laser module may be provided, which emits three colors of monochromatic light, such as red, green and blue. In an alternative embodiment, the first light source 1 has a high-power white light-emitting diode (power LED) with primary optics. The optics may, for example, comprise an encapsulation compound for the LED chip with its substrate and its terminals, and a downstream optical element such as a converging lens or a parabolic reflector. The optics lead to collimation of the white light emitted from the chip over a wide solid angle.

Figure 3:
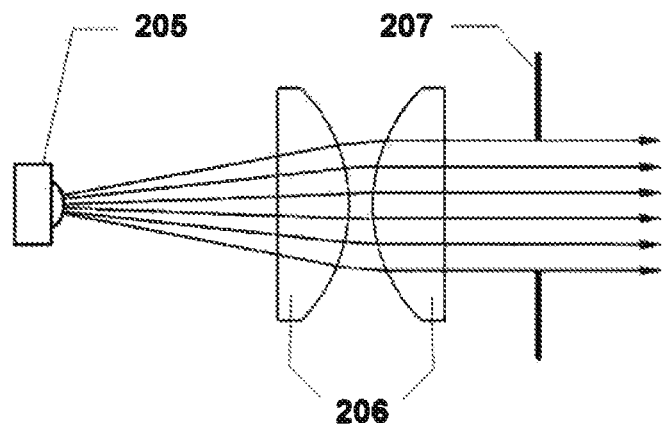
FIG. 3 shows a schematic representation of one exemplary embodiment of a light source.

FIG. 3 shows one possible embodiment of the light source 1 based on a power LED. A power LED (white) 205 emits white light, which is collimated by a planoconvex lens 206 and a light field stop 207.

Between the first light source 1 and the first end 12.1 of the cylindrical light guide 4, there is an optical beam shaping module 5 in the lighting arrangement 2.1. The beam shaping module 5 is configured in order to convert the collimated light beam of the first light source, as represented in FIG. 3, into a divergent beam with suitable expansion and a suitable beam profile. In particular, the beam shaping module 5 is configured in order to propagate the generated light beam, or the generated light, after coupling through the first end 12.1 into the cylindrical light guide 4 according to the law of total internal reflection (TIR) in the cylindrical light guide 4.

Figure 4A:
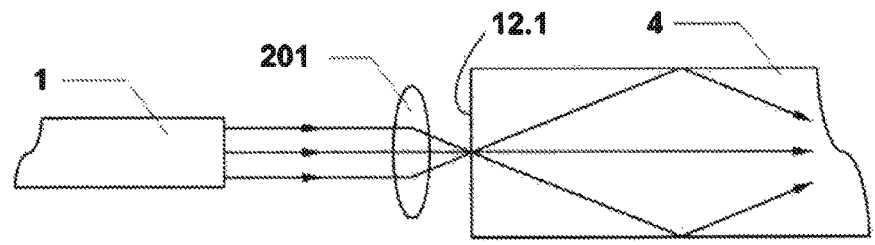
FIGS. 4*a-c* schematically show representations of exemplary embodiments of beam shaping modules.
Figure 4B:
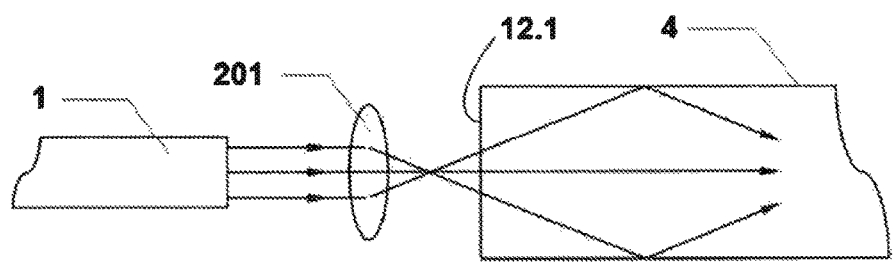

In an embodiment which is represented schematically in FIGS. 4*a* and 4*b*, the beam shaping module 5 may be formed by a biconvex lens 201. The precise embodiment of this input lens 201, particularly in relation to diameter, focal width and distance from the edge 12.1 of the light guide 4, is determined by the embodiment of the light guide 4, in particular its edge face geometry and the refractive index (light refraction and reflection at the edge of the light guide 4 are not represented separately for reasons of simplification). The configuration is preferably carried out with a view to good beam quality and high coupling efficiency, which is defined by the ratio of the light power coupled into light power emitted directly by the light source.

Figure 4C:
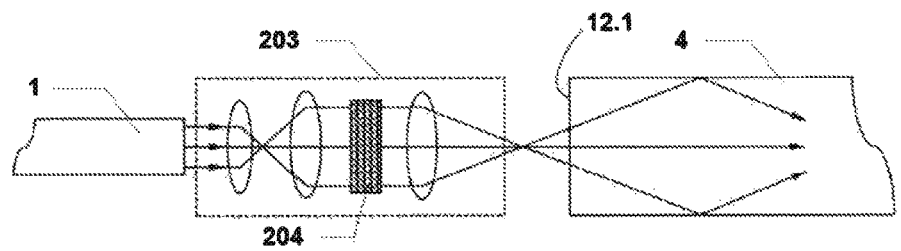

The beam shaping module 203 represented in FIG. 4c may, if need be, comprise lens systems for expanding the beam diameter before the input lens, and at least one mode filter 204. The mode filter 204 installed between two lenses controls the light which strikes the input lens, in terms of its intensity distribution, and establishes the beam profile. Amplitude and phase spatial light filters (SLM), which fulfill this optical function, may be provided. In a particular embodiment of the beam shaping module 203, the mode filter 204 is a filter ring, so that in conjunction with the lenses of the beam shaping module 203 it can produce a spherical wave with an annular beam profile.

The cylindrical light guide 4 of the lighting arrangement 2.1 according to the invention may preferably be formed from glass, polymethyl methacrylate (PMMA), polydimethylsiloxane (PMDS), polycarbonate (PC), polystyrene (PS), or other amorphous thermoplastic materials or mixtures of substances which fulfill the requirements mentioned below for light guide materials.

The cylindrical light guide 4 is, in particular, a solid body which is homogeneous, nonscattering and transparent for the wavelength of the first light source 1. The light can propagate in different beam paths, also referred to as wave modes (abbreviated form: modes) in the cylindrical light guide 4. (Almost) all modes other than the axial mode, in which the light travels along the central axis 14 of the cylindrical light guide 4, are distinguished by total internal reflection (TIR) at an interface with the surrounding medium (here air).

Depending on the entry angle into the cylindrical light guide 4 and the diameter of the cylindrical light guide 4, there may be very many different modes, which can be described individually by their propagation angle relative to the virtual pipe axis. With typical refractive index values of the light guide 4 of $n_{WG}$=1.4 to 1.8 and the refractive index of air $n_{air}$=1, propagation angles of up to 33.7° (for $n_{WG}$=1.8) and respectively 44.4° (for $n_{WG}$=1.4) are subject to the law of total reflection.

The cylindrical light guide 4 furthermore preferably has low scattering losses and absorption losses. In particular, the cylindrical light guide 4 has smooth, nonscattering surfaces. The cylindrical tight guide 4 is, in particular, formed in such a way that the light power loss when traveling along the entire length of the light guide 4 is less than 10%, or 0.46 dB, particularly preferably less than 5%, or 0.22 dB. This consideration relates only to the cylindrical light guide 4. That is to say, effects due to the coupling of the holographic optical element 8 to the light guide 4 are not taken into account.

The light guide material of the cylindrical light guide 4 may preferably be converted into the shape of a light pipe 4 at high temperatures in the melt by casting, injection molding or mechanical processing. As an alternative to preparation from a melt, in the case of plastics bulk polymerization may be envisioned.

The light guide material of the cylindrical light guide 4 is, in particular, selected in such a way that it has a constant density and good optical isotropy. The refractive index in the material volume in all three spatial directions of the light pipe 4 varies in particular by no more than 0.02, preferably no more than 0.01, and particularly preferably no more than 0.005.

In cross section and shape, the cylindrical light guide 4 corresponds to a light pipe with a length greater than or equal to the edge length of a couplable light guide plate (not shown in FIG. 2). As already described, the light guide 4 represented has a circular cross section. The diameter is in particular from 1 to 10 mm, preferably from 1 to 5 mm.

In one embodiment, the light pipe 4 is mirrored at the other end face 12.2, which is not used for the light input. Light exit can be avoided with a view to good light efficiency of the lighting arrangement 2.1. In an alternative embodiment, besides first light source, the cylindrical light guide 4 may have a second light source at the second end 12.2. Light can propagate through the light pipe 4 from two opposite directions. This embodiment is preferred for BLU applications, which have particularly demanding requirements for the available output light power.

The holographic optical element 8 is formed from a recording material for volume holograms. Light-diffracting grating structures acting in transmission are introduced in a defined way into the recording material by holographic exposure. The grating structures are selected in such a way that defined output or emission of light can take place from the cylindrical light guide.

Preferred materials are holographic silver halide emulsions, dichromate gelatins, or photopolymers. Photopolymers can preferably be formed from at least photoinitiator systems and polymerizable writing monomers. Particular photopolymers may in addition also contain plasticizers, thermoplastic binders and/or crosslinked matrix polymers. Photopolymers containing crosslinked matrix polymers are preferred. It is particularly preferred for the photopolymers to be formed from a photoinitiator system, one or more writing monomers, plasticizers and crosslinked matrix polymers.

The holographic optical element 8 is coupled to the cylindrical light guide 4. By the application of the holographic optical element 8, a coupling section 6 is formed, particularly in the form of a thin contact line on the surface, or lateral face 10, of the cylindrical light guide 4. The strip-shaped coupling section 6 extends, in particular, parallel to the principal axis of the cylindrical light guide 4. In other words, the coupling section 6 extends in the propagation direction of the light in the cylindrical light guide 4.

The holographic optical element 8 acts, in particular, diffractively in transmission through its volume grating inside the holographically active face. The active face is part of the flatly configured holographic recording material. The active face may occupy parts or all of the area of the holographic recording material. The active face in this case comprises at least the contact face with the cylindrical light guide 4. The active face is planar or curved in one direction. The latter is the case when the holographic optical element 8 bears with at least the active part of its face on the cylindrical light guide 4.

The holographic optical element 8 is configured in such a way that incident light is acquired angle-selectively. The acquired light is then deviated by the holographic optical element 8, or the implemented grating structures, in such a way that it leaves the cylindrical light guide 4 in one spatial direction with a narrow intensity angle distribution, which is subject to total reflection in the couplable flat light guide plate. The principal direction of the diffraction is perpendicular to the principal axis of the cylindrical light guide 4.

A homogeneous light curtain occurs from the cylindrical light guide 4 over the entire length of the coupling section 6.

The light curtain produced by the lighting arrangement 2.1 according to the invention is collimated particularly well. Propagation losses in an optically couplable light guide plate are so low that the light guiding is possible over large distances.

In one exemplary embodiment, the efficiency of the holographic optical element 8 along the propagation direction of the tight in the cylindrical light guide 4 can be adapted to the local intensity of all propagating modes. The correspondingly produced light curtain has an (almost) constant intensity along the coupling phase or coupling line 6.

The optical coupling of the holographic optical element 8 to the light in the cylindrical light guide 4 takes place via the evanescent electromagnetic field of a light wave. Evanescent waves occur behind the face on which the waves are totally reflected. The amplitude of the wave decreases steeply with a 1/e function behind the face. The penetration depth of the wave into the holographic medium which is adjacent to said face in this case depends on several parameters, such as the wavelength of the light, the reflection angle and the refractive index of the medium. It lies, for example, between 1 and 3 μm. This small penetration depth is sufficient for the wave to be able to interact with the holographic optical element 8, so that the prerequisite for diffraction at the holographic grating in the holographic optical element 8 is provided.

As already described, the holographic optical element 8 may be (additionally) connected to a (coupling) substrate 7, as shown by way of example in FIG. 2. Preferred structures are an optically transparent substrate 7 made from glass or plastic, and a photopolymer. According to the invention, it is particularly preferred for the photopolymer comprising the holographic optical element 8 to be laminated directly onto the cylindrical light guide 4. The substrate 7 in this case imparts the required mechanical stability to the photopolymer.

It is likewise possible to configure the holographic optical element 8 in such a way that the photopolymer is enclosed, preferably on both sides, by a thermoplastic film and a thin bonding layer. The bonding layer may be formed from an optically clear adhesive film. In this case, it is advantageous for the photopolymer to be applied with the bonder side on the cylindrical light guide 4.

The thermoplastic film layers of the holographic optical element 8 may be formed from transparent plastics. Essentially birefringence-free materials, such as amorphous thermoplastics, are preferably used. In particular, polymethyl methacrylate (PMMA), cellulose triacetate (TAC), amorphous polyamides (PA), polycarbonate (PC) and cyclic olefin copolymers (COC) are suitable.

Furthermore, it is possible to configure the holographic optical element 8 as a transfer film. In this case, the photopolymer may be enclosed on both sides by a peelable substrate and a thin bonding layer. After adhesive bonding of the photopolymer to the cylindrical light guide 4, the substrate may be peeled off from the photopolymer nondestructively and without leaving residue. As a result, only the photopolymer comprising the holographic optical element 8 and the bonding layer remains on the cylindrical light guide 4.

In a preferred embodiment, the contact face between the holographic optical element 8 and the cylindrical light guide 4 may he restricted to a (thin) line, which occupies only a fraction of the lateral face of the light guide 4. The coupling section may occupy less than 20°, preferably less than 10°, particularly preferably less than 5°, and extremely preferably 1-3° of the total 360° circumference of the cylindrical light guide 4.

FIGS. 5 to 8 show other exemplary embodiments of lighting arrangements 2.2 to 2.5 according to the invention. A common feature of the lighting arrangements 2.2 to 2.5 represented is that all the lighting arrangements 2.2 to 2.5 have a plate-shaped light guide 16 optically coupled to at least one cylindrical light guide 4. The plate-shaped light guide 16 has four narrow sides 18, 20. Furthermore, the plate-shaped light guide 16 has two wide sides 22, 24. In particular, the flat light guide 16 has a rectangular lower side 24 and a rectangular upper side 22.

Figure 5:
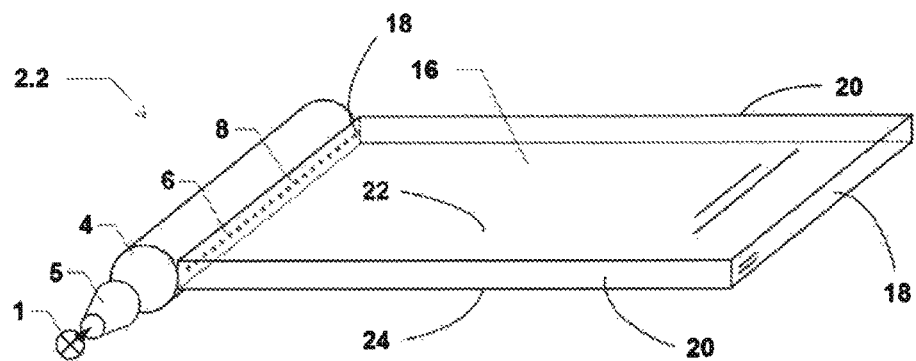
FIG. 5 shows a schematic representation of another exemplary embodiment of a lighting arrangement according to the invention.

As can be seen from FIG. 5, besides the flat light guide 16, the lighting arrangement 2.2 has the components 1 to 8 already described. The light output from the cylindrical light guide 4 by means of the holographic optical element 8 is coupled on one of the two shorter narrow sides into the flat light guide 16. In particular, according to this exemplary embodiment (almost) direct coupling of the light from the cylindrical light guide 4 into the flat light guide 16 takes place (i.e. in particular without an additional coupling substrate).

The light curtain enters according to the lighting arrangement 2.2 through the edge 18 into the light guide plate 16. The length of the cylindrical light guide 4 is in the present case selected in such a way that the coupling section 6 with the holographic optical element 8 extends over the entire length of the edge 18 of the flat light guide 16.

Figure 6:
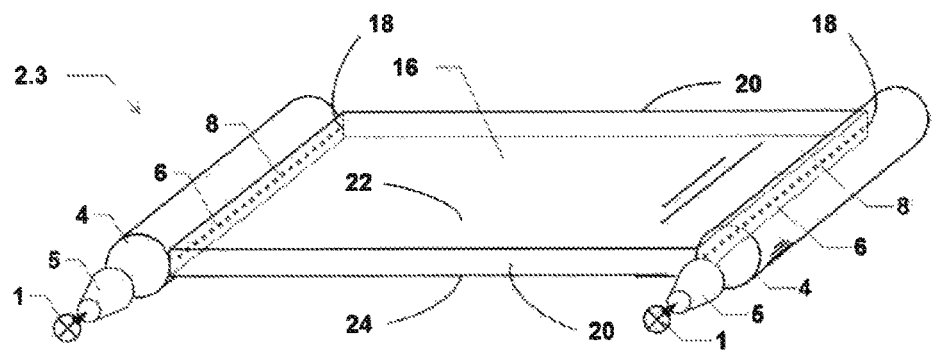
FIG. 6 shows a schematic representation of another exemplary embodiment of a lighting arrangement according to the invention.

The lighting arrangement 2.3 represented in FIG. 6 differs from the previously described lighting arrangement 2.2 in particular in that two cylindrical light guides 4 are provided. In particular, according to this exemplary embodiment light can be coupled into the planar light guide 16 on two opposite narrow sides 18. It is to be understood that according to other variants, as an alternative or in addition, the input of light may also take place through at least one of the longer narrow sides 20 and/or by using an additional substrate. For example, the input of light may take place through arbitrarily selected edges 18, 20 from two, three or four cylindrical light guides 4 according to the invention.

Figure 7:
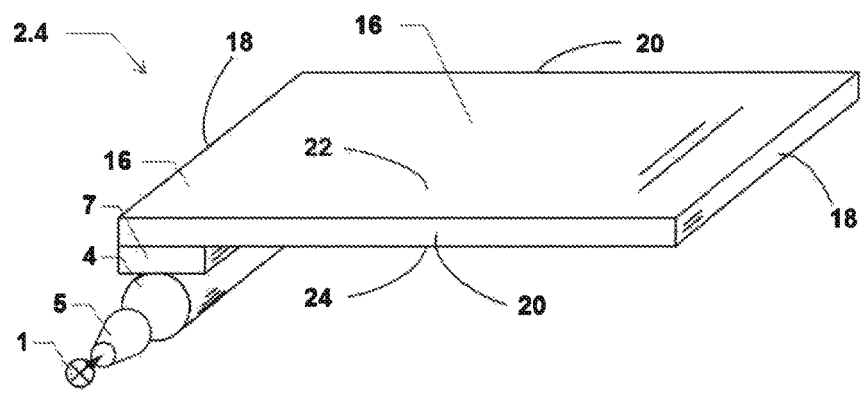
FIG. 7 shows a schematic representation of another exemplary embodiment of a lighting arrangement according to the invention.
Figure 8:
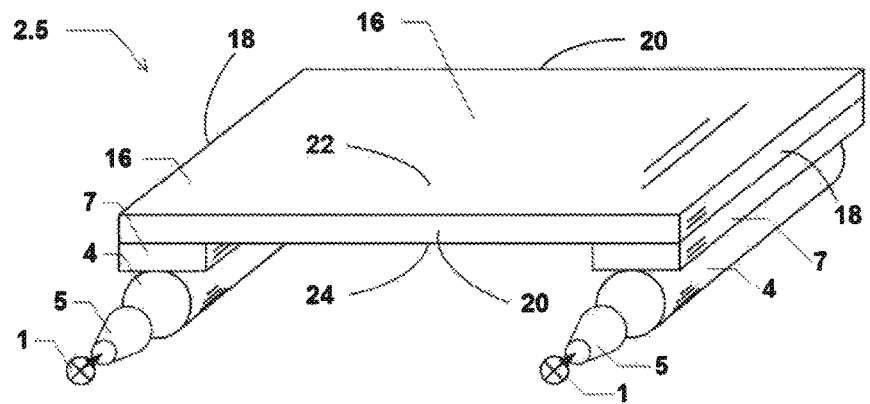
FIG. 8 shows a schematic representation of another exemplary embodiment of a lighting arrangement according to the invention.
Figure 9:
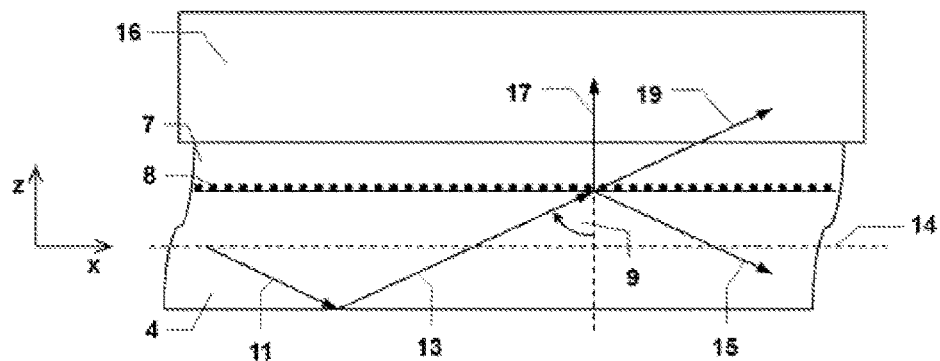
FIG. 9 shows a schematic representation of one exemplary embodiment of a lighting arrangement according to the invention with an exemplary light beam path indicated.

FIGS. 7 and 8 show exemplary embodiments in which the light from one or two cylindrical light guide/s 4 are coupled into the flat light guide 16 on a wide side 24. In the lighting arrangement 2.4, the light is coupled in an edge region of the wide side 24. In particular, the cylindrical light guide 4 extends parallel to the narrow side 18. The light curtain preferably enters the plate-shaped light guide 16 through the rear-side face 24. The front face 22 is, in particular, defined as the face through which the light exit from the plate-shaped light guide 16 takes place in the direction of an LCD panel (not represented). Furthermore, the length of the cylindrical light guide 4 is selected in such a way that the coupling section 6 with the holographic optical element 8 extends over the entire width or height of the flat light guide 16, depending on whether horizontal or vertical installation has been selected.

FIG. 8 shows another exemplary embodiment with two cylindrical light guides 4 according to the invention. The two cylindrical light guides 4 are arranged on opposite edge regions of the wide side 24. In particular, the two light guides 4 extend parallel to one another and parallel to the respective narrow sides 18.

As an alternative, the input of light from two or more cylindrical light guides 4 according to the invention may take place through arbitrarily selected positions. Positions further in the middle of the plate are likewise possible.

Furthermore, the exemplary embodiments in FIGS. 7 and 8 differ from the exemplary embodiments in FIGS. 5 and 6 in that the lighting arrangements 2.4 and 2.5 have at least one additional coupling substrate 7 between the cylindrical light guide 4, or the holographic optical element 8, and the flat light guide 16.

It is to be understood that according to other variants, as an alternative or in addition, the input of light may also take place through at least on a wide side parallel to one of the longer narrow sides 20 and/or without using an additional substrate 7.

The light guide plate 16, which is coupled at least to one cylindrical light guide 4 according to the invention, preferably has elements for output of the light. For example, the planar light guide 16 may comprise printed patterns of white color, roughened surfaces, impressed light-refracting structures and/or holographic optical output elements. The ideal type, number or density of these structures may be selected freely in wide ranges, so that the light distribution is adapted for example to the specification of the BLU. The aim of BLUs for 2D displays is, in particular, very homogeneous illumination of the panel. In some autostereoscopic 3D display technologies, the aim may consist in homogeneous transmission with a preferential direction.

The lighting arrangements according to the invention produce a very accurately defined spatial intensity distribution and propagation directions, and therefore a high beam quality from the input face, since it is made possible to construct very flatly constructed light guide plates and mode waveguides in different, in particular larger-area embodiments, which have low-loss wave guiding, so that mechanically robust BLUs with a high light efficiency and low technical complexity can be produced.

FIGS. 9 to 13 show various exemplary embodiments of lighting arrangements with light beam paths indicated.

Preferred configurations of the hologram, in particular its angle functions and spectral widths, which determine both the light output from the light guide 4 according to the invention and the light input into the flat light guide 16, will be described below.

The hologram is configured as a transmission hologram, so that it reconstructs light that propagates in the xz plane in the light pipe by total reflection, i.e. it diffractively deviates this light at the gratings. The reconstruction angle 9 of FIG. 9 will be referred to as the azimuth angle $\theta_R$, or ThetaR. ThetaR is defined as the incidence angle of the light, at which the diffraction efficiency of the hologram reaches its maximum, overlaps with the angle distribution (likewise relative to the azimuth angle) of the rays which reach the contact face of the hologram. The preferred angle range of ThetaR lies between the critical angle for total reflection and 85°, particularly preferably between the critical angle for total reflection and 80°.

In order to illustrate the critical angle, the following calculation example will be used: with refractive index values of the light guide $n_{WG}$ of from 1.4 to 1.8 and the refractive index of air $n_{air}=1$ as the external medium, angles of up to at least 33.7° (for $n_{WG}=1.8$) and respectively 44.4° (for $n_{WG}=1.4$) are subject to the law of total reflection. The critical angle is defined as this limit value.

Depending on various parameters, for example the reconstruction angle, the layer density and the refractive index modulation, the hologram exhibits a narrower to wider spectral acceptance. In the case of broadband lighting, for example in the case of LED lighting, a sufficient spectral width of the hologram, which ideally comprises the emission spectrum of the light source, is desirable. The preferably selected layer thickness of the hologram for LED lighting is from 0.5 to 30 nm with a preferred refractive index modulation of from 0.025 to 0.060. Particularly preferably, the layer thickness is from 1 to 17 nm, more particularly preferably from 1 to 6 nm.

In one standard embodiment according to the invention, the refractive index modulation is adjusted, by means of the holographic exposure time and/or exposure intensity, in such a way that overmodulation of the grating is avoided, so that a high diffraction efficiency, ideally lying close to 100%, is achieved.

In an alternative embodiment, the diffraction efficiency is adjusted by means of the length of the active hologram phase, i.e. by means of the length of the coupling face, in the form of a gradient, with the aim of improving the homogeneity of the signal beam along the coupling face (x direction)

In the case of illumination with red-green-blue (RGB) light sources, such as lasers and RGB LEDs, it is advantageous to use a plurality of holographic gratings for output of the light. In each case, a grating is spectrally matched to one light color, i.e. reconstructed in this spectral range. The gratings are preferably multiplexed, i.e. written over one another, in a holographic film, particularly in a photopolymer film. The production of multiplexed holograms is in this case, for example, carried out by means of simultaneous, individual chronologically sequential or individual chronologically overlapping exposures.

In another embodiment, a plurality of holograms are placed above one another in individual films. The exposure of the individual holograms is typically carried out in single exposures steps with different recording films. These individual films are, for example, produced by cold or hot lamination or adhesive bonding of films in a plurality of layers.

In the case of illumination of the light pipe with two light sources, it is likewise advantageous to use a plurality of holographic gratings for the output of light. In each case, one or a set of holograms deflects the light of a preferred light source assigned to it. In total, the number of holograms is doubled by the second light source.

The placement of a plurality of hologram films above one another and the multiplexing of individual holograms in one film may be combined freely with one another, so that a desired compromise can be found between simple production and hologram efficiency.

The hologram is configured as a transmission hologram, so that it reconstructs light that propagates in the xz plane in the light pipe 4 by total reflection, i.e. it diffractively deviates this light at the gratings. The reconstruction angle $\theta_R$ (azimuth angle ThetaR), defined as the incidence angle of the light at which the diffraction efficiency of the hologram reaches its maximum, overlaps with the angle distribution (likewise relative to the azimuth angle) of the rays which reach the contact face of the hologram. The allowed angle range of $\theta_R$ is defined as follows:

$$\theta_{3,crit} < \theta_S < 90°,$$

where $\theta_{3,crit}$ is the critical angle of the light guide 4.

The preferred angle range of $\theta_R$ lies between $\theta_{3,crit}+5°$ and 85°, and particularly preferably between $\theta_{3,crit}+10°$ and 80°.

The signal beam 17 indicates the direction of the light deviated at the grating by diffraction. Its direction vector lies in the yz plane, see FIGS. 10 to 13. The term out-of-plane holograms is used because said diffraction direction lies outside the plane of the reconstruction beam 13 (xz plane according to FIG. 9). The deviation angle 21, which the signal beam occupies with the yz plane, will be denoted below as $\theta_S$ (azimuth angle ThetaS), and the critical angle for light propagation by total reflection in the light guide 16 will be denoted as $\theta_{crit}$. $n_5$ is the refractive index of the light guide and $n_6$ is the refractive index of the substrate.

Figure 11:
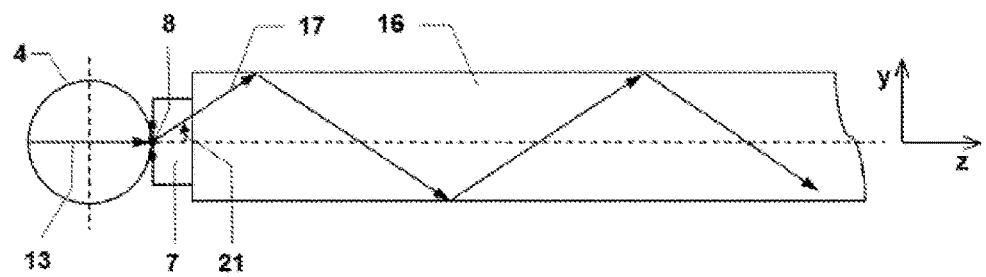
FIG. 11 shows a schematic representation of one exemplary embodiment of a lighting arrangement according to the invention with an exemplary light beam path indicated.
Figure 12:
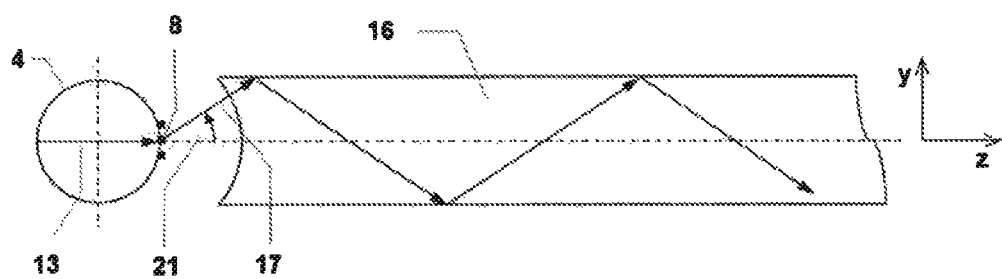
FIG. 12 shows a schematic representation of one exemplary embodiment of a lighting arrangement according to the invention with an exemplary light beam path indicated.
Figure 13:
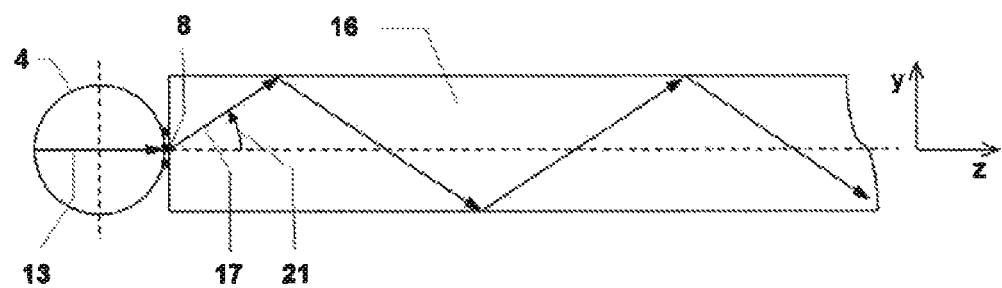
FIG. 13 shows a schematic representation of one exemplary embodiment of a lighting arrangement according to the invention with an exemplary light beam path indicated; and In what follows, the same references are used for elements which are the same.

The allowed angle range of $\theta_S$, in the case of edge input through a substrate according to FIG. 11, is defined as follows:

$$0° < \theta_S < \arcsin\left(\frac{n_5}{n_6}\cos\theta_{crit}\right)$$

In the case of direct edge input without a substrate (FIGS. 12 and 13), or with a matched refractive index of the substrate and light guide, the condition changes as follows:

$$0° < \theta_S < \arcsin(\cos\theta_{crit})$$

Figure 10:
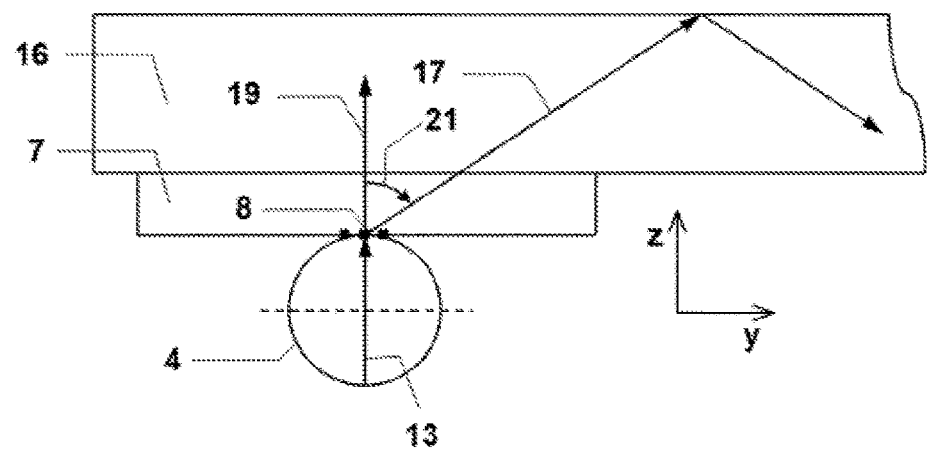
FIG. 10 shows a schematic representation of one exemplary embodiment of a lighting arrangement according to the invention with an exemplary light beam path indicated.

The allowed angle range of $\theta_S$, in the case of rear-side input through the substrate, see FIG. 10, is defined as follows:

$$\arcsin\left(\frac{n_5}{n_6}\sin\theta_{crit}\right) < \theta_S < 90°$$

In the case of direct rear-side input (as in FIG. 10 with the substrate 7 omitted) or with a matched refractive index of the substrate and light guide, the condition changes as follows:

$$\theta_{crit} < \theta_S < 90°$$

The preferred angle range of $\theta_S$ lies in each case at 5°, and particularly preferably in each case at 10°, away from the limit values defined here.

In one particular embodiment, the hologram spreads the signal beam out in the yz plane, so that an angle distribution lies in the scope of the aforementioned allowed or preferred angle range.

In one particular embodiment, the signal beam does not tie in the yz plane, but deviates by a given angle.

In another embodiment, the hologram spreads the signal beam out in the xy plane.

The invention claimed is:

1. An indirect lighting arrangement, comprising:
   at least one cylindrical light guide,
   wherein at least one end of the cylindrical light guide is configured in order to couple light from a first light source into the cylindrical light guide, and
   the lateral face of the cylindrical light guide has a coupling section configured for optical coupling of the cylindrical light guide to an arrangeable plate-shaped light guide, characterized in that
   at least the coupling section has at least one holographic optical element configured for emitting light from the cylindrical light guide into the arrangeable plate-shaped light guide.

2. The indirect lighting arrangement as claimed in claim 1, characterized in that
   the holographic optical element has a grating structure such that light striking the holographic optical element from the cylindrical light guide is acquired, and
   the acquired light is deviated by the grating structure of the holographic optical element in such a way that the light leaves the cylindrical light guide in a spatial direction with an intensity angle distribution which corresponds essentially to total reflection in the arrangeable plate-shaped light guide.

3. The indirect lighting arrangement as claimed in claim 1, characterized in that
   the coupling section is a strip-shaped coupling face extending essentially parallel to the principal axis of the cylindrical light guide, and
   the strip-shaped coupling section has a holographic optical element in the form of a strip-shaped film.

4. The indirect lighting arrangement as claimed in claim 1, characterized in that
   the holographic optical element is formed from a self-adhesive material, and
   the self-adhesive holographic optical element is adhesively bonded on the coupling section.

5. The indirect lighting arrangement as claimed in claim 1, characterized in that
   the holographic optical element has at least one bonding layer at least on one side face, and
   the holographic optical element is applied on the coupling section by means of the bonding layer.

6. The indirect lighting arrangement as claimed in claim 1, characterized in that
   the cylindrical light guide has a circular cross section, the diameter of the cross section being in particular between 1 mm and 10 mm.

7. The indirect lighting arrangement as claimed in claim 3, characterized in that the strip-shaped film occupies at least less than 20° of the circumferential area of the lateral face of the cylindrical light guide.

8. The indirect lighting arrangement as claimed in claim 1, characterized in that
   the indirect lighting arrangement comprises the plate-shaped light guide, and
   the holographic optical element is optically coupled to at least one narrow side of the plate-shaped light guide, in such a way that the light is coupled into the narrow side of the plate-shaped light guide, and/or
   the holographic optical element is optically coupled to at least one wide side of the plate-shaped light guide, in such a way that the light is coupled into the wide side of the plate-shaped light guide.

9. The indirect lighting arrangement as claimed in claim 1, characterized in that
   the indirect lighting arrangement comprises the plate-shaped light guide, and
   a transparent coupling substrate is arranged between the holographic optical element and the plate-shaped light guide.

10. The indirect lighting arrangement as claimed in claim 1, characterized in that the cylindrical light guide is formed from a material selected from the group consisting of glass, polymethyl methacrylate, polydimethylsiloxane, polycarbonate and polystyrene.

11. The indirect lighting arrangement as claimed in claim 1, characterized in that
    the other end of the cylindrical light guide is configured to be reflective, or
    the other end of the cylindrical light guide is configured in order to couple light from a second light source into the cylindrical light guide.

12. The indirect lighting arrangement as claimed in claim 1, characterize in that
    the holographic optical element is formed from a material selected from the group consisting of silver halide emulsions, dichromate gelatins, and photopolymers, the photopolymers being formed from at least photoinitiator systems and polymerizable writing monomers, and the photopolymers optionally comprising plasticizers, thermoplastic binders, or crosslinked matrix polymers.

13. A method for producing the indirect lighting arrangement as claimed in claim 1, comprising:

providing a cylindrical light guide, wherein at least one end of the cylindrical light guide is configured in order to couple light from a first light source into the cylindrical light guide, and the lateral face of the cylindrical light guide has a coupling section configured for optical coupling of the cylindrical light guide to an arrangeable plate-shaped light guide, characterized in that at least one holographic optical element configured for emitting light from the cylindrical light guide into the arrangeable plate-shaped light guide is applied on the coupling section.

14. A display screen comprising at least one indirect lighting arrangement as claimed in claim 1.

15. A lamp system comprising at least one indirect lighting arrangement as claimed in claim 1.

16. The indirect lighting arrangement as claimed in claim 1, characterized in that the cylindrical light guide has a circular cross section, the diameter of the cross section being in particular between 2 mm and 5 mm.

17. The indirect lighting arrangement as claimed in claim 3, characterized in that the strip-shaped film occupies at least less than 10° of the circumferential area of the lateral face of the cylindrical light guide.

18. The indirect lighting arrangement as claimed in claim 3, characterized in that the strip-shaped film occupies at least less than 5° of the circumferential area of the lateral face of the cylindrical light guide.

19. The indirect lighting arrangement as claimed in claim 3, characterized in that the strip-shaped film occupies 1-3° of the circumferential area of the lateral face of the cylindrical light guide.

* * * * *